US009918349B2

(12) United States Patent
Razavi et al.

(10) Patent No.: US 9,918,349 B2
(45) Date of Patent: Mar. 13, 2018

(54) PROXY NODE AND METHOD

(71) Applicant: Alcatel Lucent, Boulogne-Billancourt (FR)

(72) Inventors: Rouzbeh Razavi, Dublin (IE); Holger Claussen, Dublin (IE)

(73) Assignee: Alcatel Lucent, Boulogne-Billancourt (FR)

( * ) Notice: Subject to any disclaimer, the term of this patent is extended or adjusted under 35 U.S.C. 154(b) by 92 days.

(21) Appl. No.: 14/895,654

(22) PCT Filed: Jul. 3, 2014

(86) PCT No.: PCT/EP2014/001842
§ 371 (c)(1),
(2) Date: Dec. 3, 2015

(87) PCT Pub. No.: WO2015/007370
PCT Pub. Date: Jan. 22, 2015

(65) Prior Publication Data
US 2016/0143076 A1 May 19, 2016

(30) Foreign Application Priority Data
Jul. 15, 2013 (EP) ..................................... 13306006

(51) Int. Cl.
*H04W 76/02* (2009.01)
*H04L 29/08* (2006.01)
(Continued)

(52) U.S. Cl.
CPC ......... *H04W 76/023* (2013.01); *H04L 67/101* (2013.01); *H04L 67/288* (2013.01); *H04L 69/08* (2013.01); *H04W 88/182* (2013.01)

(58) Field of Classification Search
CPC ..... H04L 67/101; H04L 67/288; H04L 69/08; H04W 76/023; H04W 88/182;
(Continued)

(56) References Cited

U.S. PATENT DOCUMENTS

2012/0054583 A1 3/2012 Park et al.
2013/0286836 A1* 10/2013 Uzelac .................. H04L 47/125
370/235

(Continued)

FOREIGN PATENT DOCUMENTS

JP 2008148299 A 6/2008

OTHER PUBLICATIONS

Anghel Botos et al, "Analysis of a transport protocol based on rateless erasure correcting codes", Intelligent Computer Communication and Processing (ICCP), 2010 IEEE International Conference on, IEEE, Piscataway, NJ, USA, Aug. 26, 2010, 7 pages.
(Continued)

Primary Examiner — Robert Lopata
(74) Attorney, Agent, or Firm — Harness, Dickey & Pierce, P.L.C.

(57) ABSTRACT

A proxy node includes reception logic operable to receive data from a first node for transmission to a second node over a communications link; determination logic operable to determine a selected proxy node from a group of proxy nodes, the selected proxy node being one of the group of proxy nodes where a difference in a communications link characteristic of a communications link between the proxy node, the selected proxy node and the second node and a communications link characteristic of a communications link between the proxy node and the second node falls within a threshold amount; and transmission logic operable to establish a rateless coded communications link for transfer of the data with the selected proxy node.

15 Claims, 8 Drawing Sheets

(51) Int. Cl.
*H04L 29/06* (2006.01)
*H04W 88/18* (2009.01)

(58) Field of Classification Search
CPC ..... H04W 72/04; H04W 72/12; H04W 76/00; H04B 7/2121; H04B 7/2123; H04Q 2213/394; H04J 2203/0069
USPC .......................................................... 370/329
See application file for complete search history.

(56) References Cited

U.S. PATENT DOCUMENTS

2013/0294289 A1* 11/2013 Kneckt ............... H04W 72/082
                                                370/254
2014/0097966 A1* 4/2014 Alexander ............ H04W 84/18
                                                340/870.02

OTHER PUBLICATIONS

Lopez et al, "A game theoretic comparison of TCP and digital fountain based protocols", Computer Networks, Elsevier Science Publishers B.V., Amsterdam, NL, vol. 51, No. 12, Jun. 19, 2007, 14 pages.
International Search Report PCT/ISA/210 for International Application No. PCT/EP2014/001842 dated Dec. 8, 2014.
Written Opinion of the International Searching Authority PCT/ISA/237 for International Application No. PCT/EP2014/001842 dated Dec. 8, 2014.

* cited by examiner

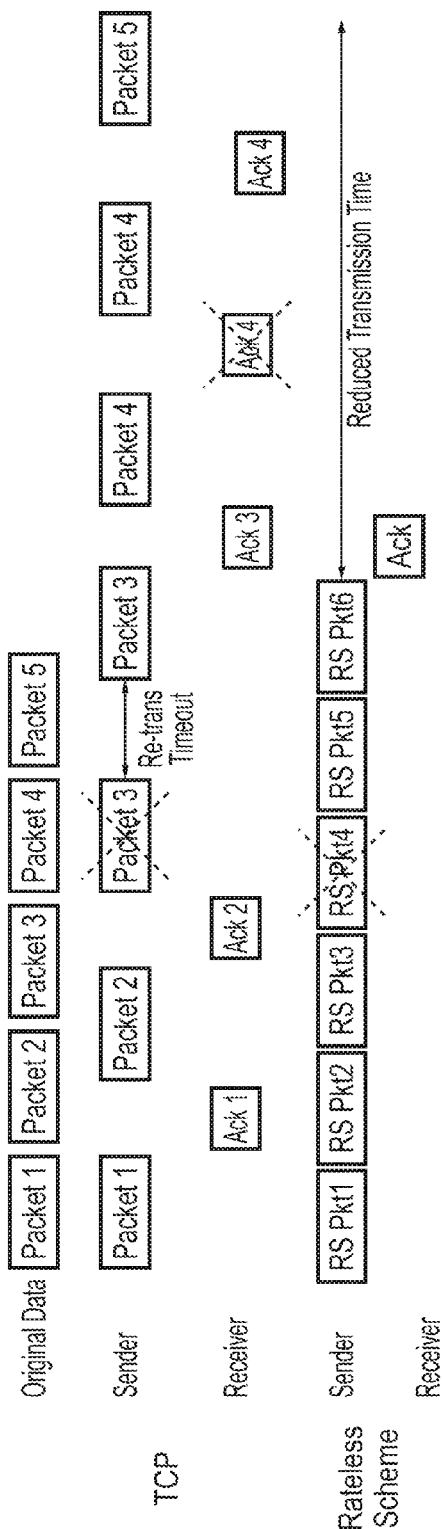
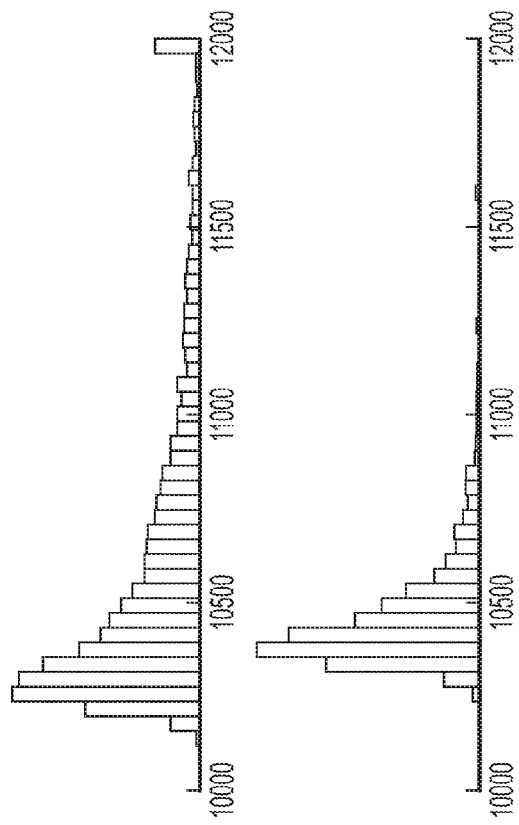
FIG. 3
FIG. 4

PROXY NODE AND METHOD

CROSS-REFERENCE TO RELATED APPLICATIONS

This is a National Phase of PCT Patent Application No. PCT/EP2014/001842, filed on Jul. 3, 2014, and claims priority to, European Application No. 13306006.1, filed Jul. 15, 2013, the contents of each of which are hereby incorporated by reference in their entirety.

FIELD OF THE INVENTION

The present invention relates to a proxy node, a proxy node method and a computer program product.

BACKGROUND

Communications networks exist for the transfer of data between nodes of the network. Communications links are provided between the nodes of the network over which the data between network nodes is transferred. Different protocols exist which define how the data is transferred between the network nodes over the communications links. Various different classifications of nodes exist which may be deployed. Although such networks enable the transfer of data between nodes, unexpected consequences can occur. Accordingly, it is desired to provide an improved technique for transferring data between nodes.

US 2012/0054583 A1 discloses a sub-packet error correction method which receives a data packet, segregates the data packet into sub-packets and encodes the sub-packets using an erasure code for transmission over a network. In embodiments, the data packet is received at a first proxy server for transmission over a lossy network and the encoded sub-packets are received at a second proxy server over the lossy network for decoding and recombining.

SUMMARY

According to a first aspect, there is provided a proxy node as claim 1.

The first aspect recognises that latency is considered as a major concern when it comes to adoption of cloud services. Additionally, lack of suitable quality of service (QoS) mechanisms and network underutilisation despite of traffic demands results in delay in deployment of cloud-based services.

Transmission Control Protocol (TCP) is currently considered as the main transport protocol. According to research, TCP carries more than 89% of the total traffic world-wide. However, TCP's performance is very sensitive to packet losses and delayed packets. Specifically, the aggressive back-off behaviour of TCP may results in underutilisation of links and increased delays. A very recent study suggests a possible 16-fold throughput improvement in networks by modifying TCP behaviour. FIG. 1 shows an example of TCP performance in terms of achievable throughput versus packet loss. As illustrated, the throughput drops significantly with small packets' drop rates (that are usual in most networks).

The increased latency as the result of TCP back-off behaviour can be particularly problematic when considering cloud-based services where service level agreement (SLA) violations may results in financial penalties for the cloud provider. Unfortunately, such excessive delays occur more frequently when there is congestion in the network and that's exactly when the TCP effects appear most. In addition to congestion, with the significant increase of mobile data usage, wireless links are becoming as integrated part of most end-to-end communications. Wireless channels normally result in higher packet drops and hence TCP is known to be very sub-optimal choice for wireless channels (hence protocols such as wireless access protocols (WAP) have their own transport protocol, wireless transport protocol (WTP)).

Despite these negative sides, TCP is still recognised for its performance reliability. Any other alternative solution should assure reliability of packet delivery without significant bandwidth overheads. As it will be explained, the rateless code based transport protocol is an efficient way to assure reliability while minimising latency. The end to end protocol has been implemented and measurements indicate that there is a 4-fold throughput improvement (over wired lines and up to 11-fold over wireless links) when using this transport protocol instead of TCP. These significant improvement gains are in-line with the quantities observed by other very recent research reports.

As explained above, TCP suffers from increased latency as a result of aggressive back-offs as well as bandwidth underutilisation. User Datagram Protocol (UDP), on the other hand, is a simpler protocol which does not provide any guarantee on the reliability of the packets' delivery process. Using traditional fixed rate error correction codes is inefficient to combat packet drops (whole packet erasures). Additionally, packet-level error correction codes results in trade-off of bandwidth and reliability and may result in unnecessary utilisation of bandwidth by forward error correction (FEC) codes. Hybrid Automatic Repeat-reQuest (ARQ) techniques in general are more efficient but their performance significantly depends on optimality of the parameters and reliability of the feedback channels.

However, the first aspect also recognises that the main issue with introduction of any scheme aiming to replace TCP, or any other protocol, is the adoption of that scheme. Since most applications use TCP or other protocols as the transport protocol, it may take a long time/effort for a new protocol to replace TCP. Therefore, there is a need for a mechanism that allows the legacy applications/network end nodes to benefit from the new protocol without the need for any modification of those nodes.

Accordingly, a proxy node may be provided. The proxy node may comprise reception logic which may receive data from a first node to be transmitted to a second node over a communications link. The proxy link may also comprise determination logic which may determine a selected one proxy node from a group of proxy nodes. The determination logic may select the proxy node by determining a communications link characteristic of a communications link between the proxy node and the second node, and by determining the communications link characteristic between the proxy node, the selected node and the second node. If this difference falls within a threshold amount then the proxy node may be selected from the group. The proxy node may also comprise transmission logic which may establish a rateless coded or fountain coded communications link for transfer of the data with the selected proxy node. In this way, the proxy node can provide the functionality required to take advantage of rateless coding without requiring any modification of existing nodes. In particular, the proxy node may select another proxy node from a group via which data can be transmitted to the second node, but the communications link via that selected node still achieves desired characteristics. That is to say, although the characteristics of the communications link may be slightly worse than the link directly between the proxy node and the second node, as long as those characteristics fall within the threshold amount, then end-to-end improvements between the proxy node and the second node can still be achieved through the use of rateless coding between the proxy node and the selected proxy node. This enables data transmitted from the first node to the second node to be received by the proxy node in accordance with, for example, a native protocol, then transmitted between the proxy node and the selected proxy node using the more efficient rateless encoding, and then forwarded by the selected proxy node to the second node using the, for example, the native protocol. This enables the more efficient rateless coding to be utilised whenever possible, without requiring any changes whatsoever in either the first or second nodes.

In one embodiment, the determination logic is operable, where a plurality of proxy nodes of the group of proxy nodes are selectable as the selected proxy node, to select that one of the plurality of proxy nodes whose communications link characteristic is closest to the communications link characteristic of the communications link between the proxy node and the second node. Accordingly, where more than one proxy node within the group can achieve the required communications link characteristics, the proxy node exhibiting the best characteristics (that is to say, the one that most closely matches or even exceeds the communications link characteristics between the proxy and the second node) may be selected. This enables the optimum proxy node to be selected.

In one embodiment, the reception logic is operable, based on at least one of a type of service and a class of user associated with the transfer of data, to prevent the determination logic from determining a selected proxy node and instead to cause the transmission logic to establish a communications link for data transfer with the second node. Accordingly, the use of rateless encoding may be offered or refused, based on the type of service associated with the data or based on the class of the user performing the data transfer. This enables the use of rateless coding to be restricted to particular user types or to particular applications.

In one embodiment, the communications link characteristic comprises at least one of a proximity of nodes and a distance between nodes. Accordingly, the physical distance between nodes may provide an indication of the communications link characteristics.

In one embodiment, the determination logic is operable to determine the selected proxy node from a sub-group of proxy nodes based on an estimated proximity determinable from addresses of the sub-group of proxy nodes and of the second node.

In one embodiment, the communications link characteristic comprises at least one of a communications delay, a number of hops and a capacity of the communications link. Accordingly, a difference in latency or capacity of the communications link may be compared in order to determine whether it is more efficient to use rateless coding.

In one embodiment, the determination logic is operable to determine the selected proxy node based on a communications link characteristic of a communications link between a proxy node of the group of proxy nodes and the second node which is measured and reported by that proxy node. Accordingly, the characteristics of the link between a particular proxy node within the group and the second node may be measured and reported by each proxy node within the group. This enables an accurate assessment of the characteristic to be made by each proxy node within the group.

In one embodiment, the threshold amount is adapted based on parameters of the rateless coded communications link. It will be appreciated that by changing the parameters of the rateless encoding scheme used to establish the rateless coded communications link, the efficiency of the scheme or its suitability under particular circumstances will vary and this can be reflected by varying the threshold.

In one embodiment, the proxy node comprises: communications link characteristic logic operable to receive a request from a requesting proxy node to determine a communications link characteristic of a communications link with a node, to establish the communications link characteristic of the communications link with the node and to report the communications link characteristic to the requesting proxy node. Accordingly, the proxy node, on receipt of a request to determine the characteristics of a communications link, may determine those characteristics and report them back to the requesting node.

In one embodiment, the proxy node comprises: decoding logic operable to decode a received rateless coded communications link to extract data, to substitute a source address identifying a source node with a source address identifying the proxy node and to forward the data to a receiving node. Accordingly, the proxy node may receive a rateless coded communications link, extract the data from that link, substitute the address of the node which sent the rateless coded data with the source address of the proxy node, and then forward the decoded data with the source address indicating the proxy node to a receiving node. This helps to ensure that the receiving node then responds to the proxy node, rather than to the source of the data.

In one embodiment, the proxy node comprises: decoding logic operable to decode a received rateless coded communications link to extract data and to store the data for access by a receiving node. Accordingly, the proxy node may store the decoded data ready for access by the receiving node. In embodiments, the proxy node may then provide the stored decoded data in response to a request from the receiving node.

In one embodiment, the transmission logic is operable to identify the selected proxy node to the first node. Accordingly, the proxy node may inform the first node of the identity of the selected proxy node in order that the first node may inform the receiving node to enable the receiving node to request data being stored for the receiving node at the selected proxy node.

In one embodiment, the proxy node comprises: encoding logic operable to substitute a destination address identifying the proxy node with a destination address identifying another proxy node and to utilise a rateless coded communications link for transfer of the data with the another proxy node.

In one embodiment, the proxy node comprises: rejection logic operable, when no acknowledgement indication is received from the receiving node, to forward an indication of the rejection to a source node. Accordingly, when a node fails to acknowledge receipt of data from a proxy node, which may indicate that the data transfer is being blocked by, for example, a firewall, an indication that the data may be being blocked or not received may be provided by the proxy node to the node which was the source of the data which the proxy node is attempting to deliver.

In one embodiment, the reception logic is operable, on receipt of the indication of the rejection, to prevent the determination logic from determining a selected proxy node and instead to cause the transmission logic to establish a communications link for data transfer with the second node.

Accordingly, should an indication of rejection be received by the proxy node, then an attempt to deliver the data via the selected proxy may be ceased and, instead, the data may be delivered over a communications link between the proxy and the second node.

In one embodiment, the proxy node comprises: modification logic operable to decode a rateless coded communications link to extract data, to substitute a destination address identifying the proxy node with a destination address identifying the first node and to forward the data to the first node.

In one embodiment, the proxy node comprises: forwarding logic operable to receive acknowledgement data from a sending node and to forward the acknowledgement data without rateless encoding to a receiving node. Accordingly, acknowledgement data may be prevented from being subject to rateless encoding in order to more rapidly deliver such acknowledgement data more quickly.

According to a second aspect, there is provided a proxy node method as claimed in claim 14.

In one embodiment, the step of determining comprises, where a plurality of proxy nodes of the group of proxy nodes are selectable as the selected proxy node, selecting that one of the plurality of proxy nodes whose communications link characteristic is closest to the communications link characteristic of the communications link between the proxy node and the second node.

In one embodiment, the method comprises: preventing, based on at least one of a type of service and a class of user associated with the transfer of data, the step of determining from determining a selected proxy node and instead establishing a communications link for data transfer with the second node.

In one embodiment, the communications link characteristic comprises at least one of a proximity of nodes and a distance between nodes.

In one embodiment, the communications link characteristic comprises at least one of a communications delay, a number of hops and a capacity of the communications link.

In one embodiment, the step of determining comprises determining the selected proxy node from a sub-group of proxy nodes based on an estimated proximity determinable from addresses of the sub-group of proxy nodes and of the second node.

In one embodiment, the step of determining comprises determining the selected proxy node based on a communications link characteristic of a communications link between a proxy node of the group of proxy nodes and the second node which is measured and reported by that proxy node.

In one embodiment, the method comprises: receiving a request from a requesting proxy node to determine a communications link characteristic of a communications link with a node, establishing the communications link characteristic of the communications link with the node and reporting the communications link characteristic to the requesting proxy node.

In one embodiment, the method comprises: decoding a received rateless coded communications link to extract data, substituting a source address identifying a source node with a source address identifying the proxy node and forwarding the data to a receiving node.

In one embodiment, the method comprises: decoding a received rateless coded communications link to extract data and to store the data for access by a receiving node.

In one embodiment, the method comprises: identifying the selected proxy node to the first node.

In one embodiment, the method comprises: substituting a destination address identifying the proxy node with a destination address identifying another proxy node and utilising a rateless coded communications link for transfer of the data with the another proxy node.

In one embodiment, the method comprises: when no acknowledgement indication is received from the receiving node, forwarding an indication of the rejection to a source node.

In one embodiment, the method comprises: on receipt of the indication of the rejection, preventing the determination logic from determining a selected proxy node and instead establishing a communications link for data transfer with the second node.

In one embodiment, the method comprises: decoding a rateless coded communications link to extract data, substituting a destination address identifying the proxy node with a destination address identifying the first node and forwarding the data to the first node.

In one embodiment, the method comprises: receiving acknowledgement data from a sending node and forwarding the acknowledgement data without rateless encoding to a receiving node.

According to a third aspect, there is provided a computer program product operable, when executed on a computer, to perform the method steps of the second aspect.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which:

FIG. 3 illustrates a schematic example comparing TCP and a transmission scheme based on rateless codes;

FIGS. 4a and 4b illustrate an example histogram of the actual number of rateless coded packets required to successfully decode original packets for two different coding strategies;

DESCRIPTION OF THE EMBODIMENTS

Overview

Figure 1:
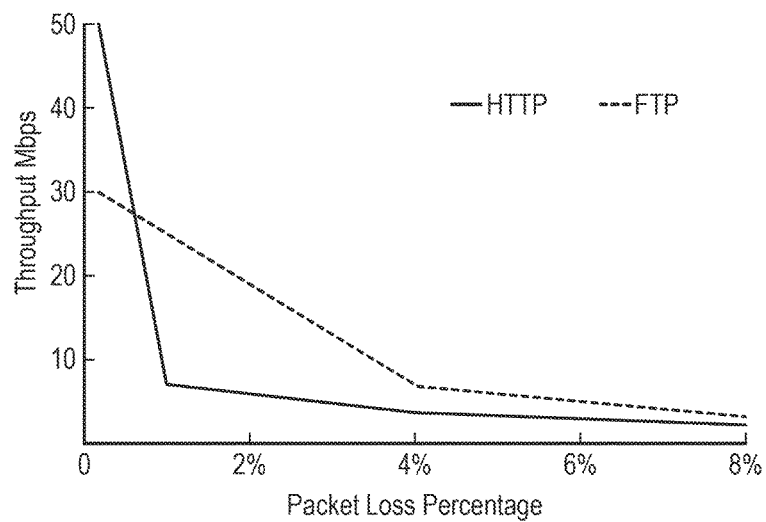
FIG. 1 illustrates an example of TCP performance in terms of achievable throughput versus packet loss.

Before discussing the embodiments in any more detail, first an overview will be provided. Embodiments provide a technique where data transmissions between a first node and a second node are received by a first proxy node. That first proxy node determines whether better performance can be achieved by establishing a communications link directly with the second network node, or whether to establish a rateless communications link with a selected proxy node which then in turn establishes a communications link with the second network node. Embodiments recognise that although establishing a communications link via the selected proxy node may increase latency, this increase in latency can be more than compensated for by the increased throughput provided by the rateless coded communications link. In particular, by selecting a proxy node which has a high latency between the two proxy nodes, but a low latency between the selected proxy node and the second node, the proxy node can be reasonably certain that the selected proxy node is as close as possible to the second node, in order that the majority of the overall communications link between the proxy node and the second node is ratelessly encoded in order to maximise use of rateless encoding. This arrangement can be used both for both service providers where the selected proxy node is selected to be as close as possible to a destination node, and for content distributors where the selected proxy node is as close as possible to the end user who is then redirected to the proxy node in order to retrieve the requested data.

Embodiments provide a method that enables the use of rateless codes for delivery of delay-sensitive (or premium) traffic flows using the existing internet infrastructure. Rateless codes are relatively new and are mainly used for channels where no feedback is available (for example, broadcasting applications). Because of their special properties, deploy rateless codes may be used in order to prioritize delay-sensitive services and to maximize network utilization. This can result in improved quality of service and reduced communications latency. In an implemented system using end-to-end rateless code based packets delivery, throughput improvements of up to 4-times for wired networks and up to 11-fold for hybrid wired and wireless networks was observed compared to the traditional TCP-based transport protocol.

Embodiments provide a mechanism based on distributed proxy servers. This allows all legacy end-points (users and servers) to be able to benefit from the advantages of the rateless codes whilst the use of the scheme remains transparent to them. As a part of this approach, a source node needs to decide which proxy server/route to be used for data transport.

Before discussing embodiments in any more detail, first an overview of rateless codes will be provided.
Rateless Codes The principles of the encoding and decoding techniques of rateless coding for transmission over erasure channels will now be explained. Luby transform (LT) codes are the first practical realization of rateless codes and these can be used to explain the principles of rateless codes (whilst many other implementations are possible).
Encoding Procedure Assume a data message consisting of K input (source) symbols $v=[v_1 \, v_2 \ldots v_K]$, with each symbol containing an arbitrary number of bits. The terminology used in original paper introducing rateless codes refers to the original data message v as a "file". For the sake of simplicity, consider a hypothetical example of a data message containing four two-bit symbols given by the vector $v=[00 \, 10 \, 11 \, 01]$.

Subsequently, the LT-encoded symbols $c=[c_j], 2 \, j=1, \ldots, N$, are simply the modulo-2 sum (i.e., the eXclusive OR (XOR)) of $d_c$ distinct input symbols, chosen uniformly at random. The actual $d_c$-value of each symbol to be encoded is then chosen from a pre-defined distribution $f(d_c)$, which is also sometimes referred to as the output distribution. Assume that the first dc-value sampled from $f(d_c)$ is 2. Consequently, two input symbols will be chosen at random from v. Assume that the two selected source symbols correspond to the first and second symbol in v. In such a case, $c_1$ will be calculated as $00 \otimes 10 = 10$, where "$\otimes$" denotes the XOR function.

The encoding algorithm proceeds in the same manner, each time selecting a dc-value sampled pseudo-randomly from $f(d_c)$ and then calculating the encoded symbol according to the XOR product of a dc-number of pseudo-randomly selected source symbols. It will be appreciated that some prefer to refer to the encoded symbols as the "LT-encoded packets" due to the natural applicability of LT codes to communication channels.

Figure 2:
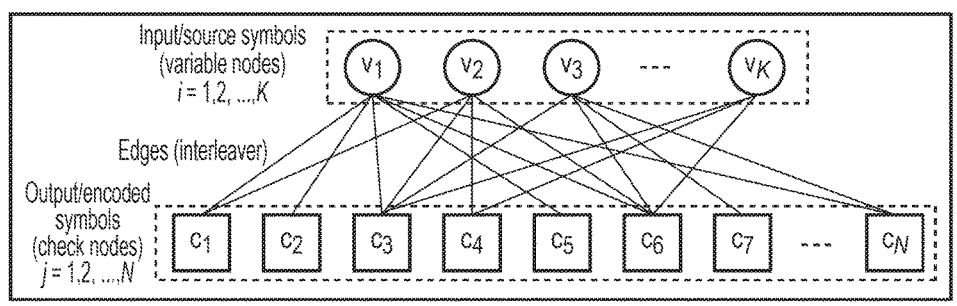
FIG. 2 illustrates a bipartite-graph-based description of an Luby theorem code.

The connection between the input and output symbols can also be diagrammatically represented by means of a bipartite graph, as shown in FIG. 2. Using graph-related terminology, the input source symbol may be referred to as a variable node, while the LT-encoded symbol can be regarded as a check node. The number of edges emerging from each check node corresponds to the dc-value sampled from $f(d_c)$ and for this reason, dc is sometimes referred to as the check degree.

FIG. 2 illustrates a bipartite-graph-based description of an LT code showing the source symbols (variable nodes) and the LT-encoded symbols (check nodes). The symbols can be of an arbitrary size. For instance, c4 is calculated by the modulo-2 sum (XOR product) of v2 and vK in the specific example portrayed in this bipartite graph.
Decoding Procedure Now consider an erasure channel, in which encoded symbols of c are erased during the ensuing transmission. Simplistically speaking, the task of the decoder is that of recovering the erased symbols from the unerased ones. The decoding process commences by locating a degree-one input symbol; i.e., a symbol that is not XOR-combined with any other. The decoder will then modulo-2 add the value of this symbol to all the LT-encoded symbols relying on it and then removes the corresponding modulo-2 connections, where each connection is represented by an edge on the associated bipartite graph (see FIG. 2). The decoding procedure continues in an iterative manner, each time starting from a degree-one symbol.
Rateless Codes with Feedback According to the above and with an efficient implementation, any N original packets can be decoded using any N rateless coded packets with a high probability. This is particularly important since it removes the requirement for the sender to retransmit a data packet that is dropped or received with uncorrectable errors (if there are error correction codes in use). Instead, the sender can continue transmitting rateless coded packets until N packets are received. At this point the receiver can send a single acknowledgment packet and the sender can move on to the next group of packets. This can significantly improve the latency of the transmission compared to TCP, especially under congestion conditions when the TCP congestion window is small.

FIG. 3 shows a schematic example comparing TCP and a transmission scheme based on rateless codes. In this rateless scheme, first, the number of packets involved in each batch should be decided and communicated with the receiver. Achieving an optimised size of the batch will be discussed below. This rateless code based transport protocol will be very similar to the UDP, in that the transmitter will send data packets consequently. However, once enough correct packets are revived at the receiver side, it will send an acknowledgment and the transmitter can move on to the next batch. If the size of the batch is changed, it should be communicated with the receiver.

It should be noted that all rateless coded packets contain mapping information in respect to the original packets. In FIG. 3, for example, RS Pkt 1 might be result of the XOR operation of original packet 5 and 3. Since each batch of rateless coded packets covers a certain range of original packets, the receiver can readily determine that each received packet belongs to a particular batch. Since there is a chance that the acknowledgement (ack) message is dropped, if the receiver keeps receiving RS packets belonging to a previously-acknowledged batch, it can assume that the ack message has not been received and it can re-send the ack message.

It is generally advised that this method of packet transportation be only used for delay-sensitive or premium services as a means of prioritisation of packets delivery. In addition, due to the randomness nature of the rateless coding, it is possible that some coded packets are duplicated or some specific packets are missing in a given number of coded packets. Therefore, in practice, some overhead may be required in order to assure successful decoding of rateless coded packets. However, this overhead is marginal (1-8%). The actual overhead depends on the coding parameters. For example, with existing coding methods, it is possible to choose coding parameters such that the mean of the overhead is small with larger variance or instead use a strategy that requires higher overheads on average but with lower variance.

FIGS. 4a and 4b show an example histogram of the actual number of rateless coded packets required to successfully decode 10,000 original packets for two different coding strategies. FIG. 4a shows the case where the average number of required packets is smaller but the variance is higher than for FIG. 4b.

Performance of the Rateless Code Based Transport Protocol

The full end-to-end transport solution has been implemented to examine the feasibility and to evaluate the performance gains of the above described transport protocol based on rateless codes. Compared to the traditional TCP-based transport, embodiments provide a throughput gain of about 4-times when considering wired links and up to 11-times when communication path consists of wireless links.

Figure 5:
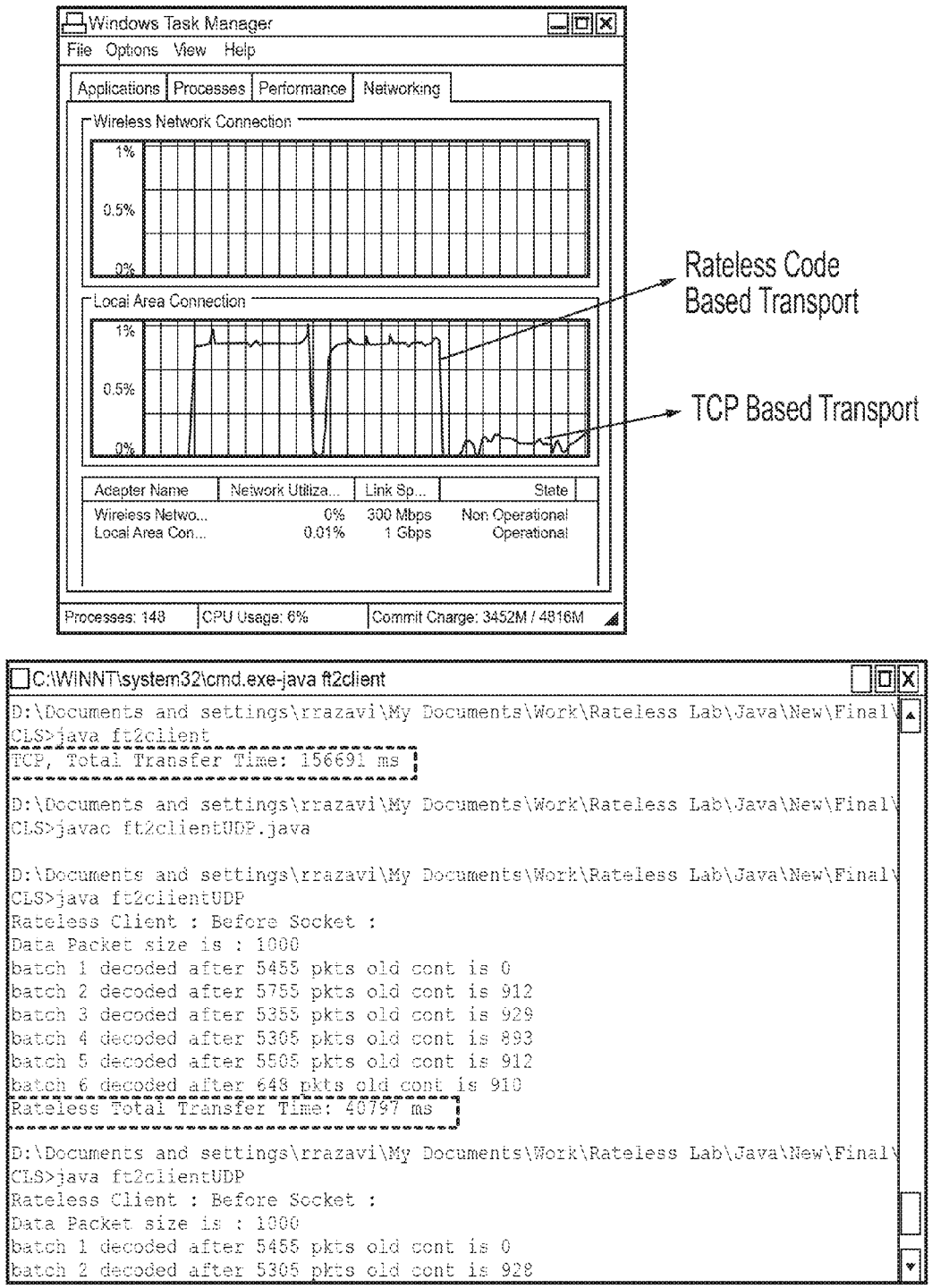
FIG. 5 illustrates some snapshots comparing the TCP-based data transport with embodiments for a wired communication scenario.

FIG. 5 shows some snapshots comparing the TCP-based data transport with embodiments for a wired communication scenario. In this example, file transfer was used as a case study to the compare throughput of the two schemes.

Using Proxy Servers for Easier Adoption of Rateless Codes

To facilitate adoption of the transport protocol based on the rateless codes, proxy nodes/servers can be used to encode original TCP packets into rateless coded packets and to decode them at the remote side back to the original TCP packets. This way, the end nodes (TCP sender/receiver) may not be even aware of the translation happening by the Proxy servers within the communication path. In its most simple form, proxy servers merely encapsulate/decapsulate TCP packets into/from rateless coded packets. The source (coder) proxy server uses the IP address of the remote (decoder) proxy server for the rateless coded packets. The acknowledgement packets will be passed to the source without any modification.

Figure 6:
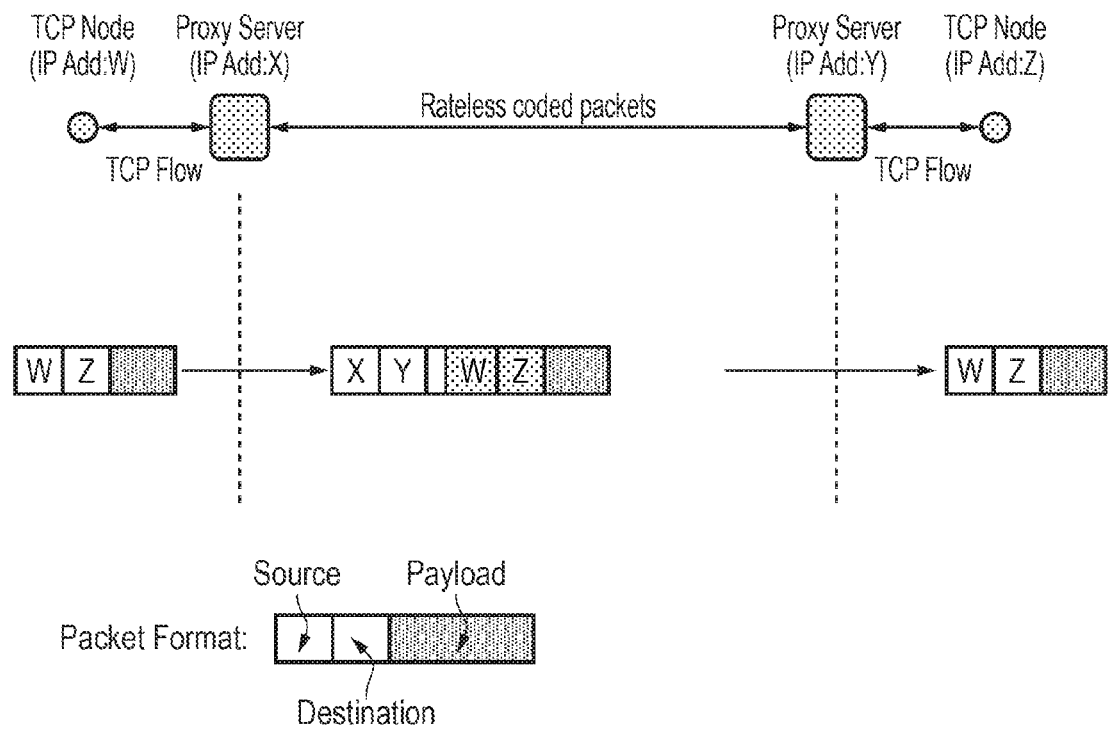
FIG. 6 is a simplified illustration of the use of proxy servers.

FIG. 6 shows a simplified illustration of the use of proxy servers. This approach has a number of advantages: End nodes can be unaware of rateless coded transport protocol. This is important considering a diverse range of end nodes from mobile terminals to end servers (or applications if the scheme is to be implemented at the application level) existing today; The encoding and especially decoding burden is on the proxy servers rather than the end points; As a by-product of using the rateless code transport protocol, data is "encrypted" when it travels between the two sites/data centres. There are also a number of disadvantages: There exists a requirement that there are proxy servers (encoder and decoder) sitting within the communication path and ideally close to the source and the destination (otherwise if the path between the proxies compared to the overall communication path is small the gain will be marginal). Since the two end-points should remain ideally completely unaware of any of the protocol translation processes that are happening during the transport path, the routing path may not necessarily goes through proxy servers. Therefore, the application of this scheme is limited to the scenarios where existence of such proxy servers within the communication path is guaranteed. A good example data transport between data centres where those proxy servers can be deployed at the gateways of different data centres. Those proxy servers are aware of the address of their peer on the destination data centre and hence can communicate with them. Similarly, any other similar type of intra-corporate communications can benefit from this scheme.

Figure 7:
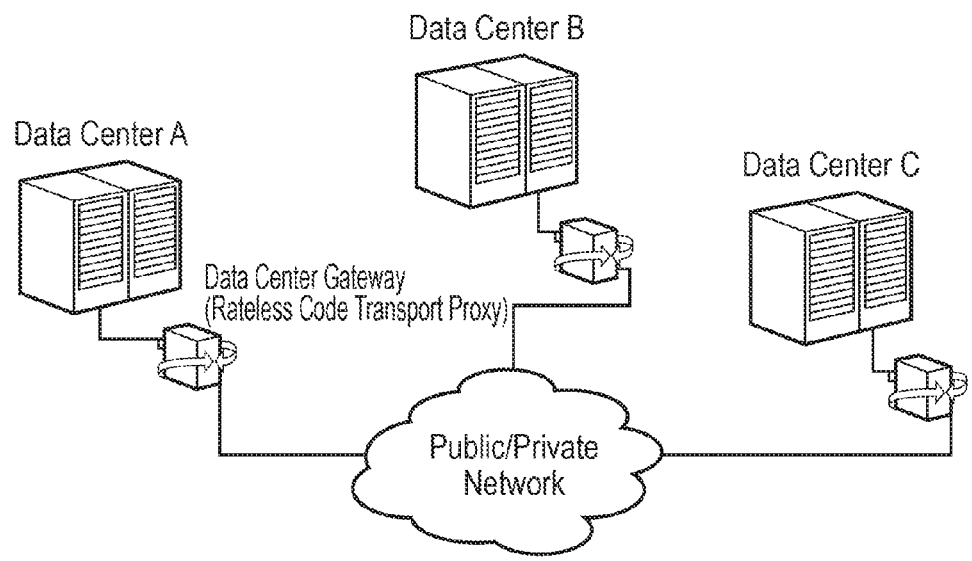
FIG. 7 illustrates an embodiment using proxy servers to enable rateless code transport protocol.

FIG. 7 shows an illustrative embodiment of using this scheme using proxy servers to enable rateless code transport protocol.

Further Embodiments

Embodiments mentioned above show where intra-corporate/inter data centre communications can benefit from the rateless code transport protocol. Further embodiments provide ways to enable service providers and content providers to additionally benefit from the rateless code transport protocol without any modifications needed to the end nodes (users and servers).

Service Providers

Embodiments provide a solution that enables a service provider to allow all of its users to be able to benefit from the rateless code transport protocol without the need for any modifications at the user/server sides. This is challenging but at the same time rewarding as it makes the adoption of the rateless codes very simple and subsequently very likely.

Embodiments address two main issues: 1) How to select appropriate proxy servers; and 2) How to efficiently handle the TCP connections and traffic flows.

Since an operator is deploying the solution, selecting a proxy server close to the user is not an issue. This can be done at the operators local gateways (i.e. POPs) for example. However, the challenging task is to select an appropriate (if any) proxy server close to the destination node. The solution assumes that there are many proxy servers available that are geographically distributed and ideally located close to major data centres. This is not an impractical assumption, since it is possible to rent virtual machines all over the globe without the need for a significant financial investment (e.g. Amazon Elastic Compute Cloud [EC2] offerings).

Figure 8:
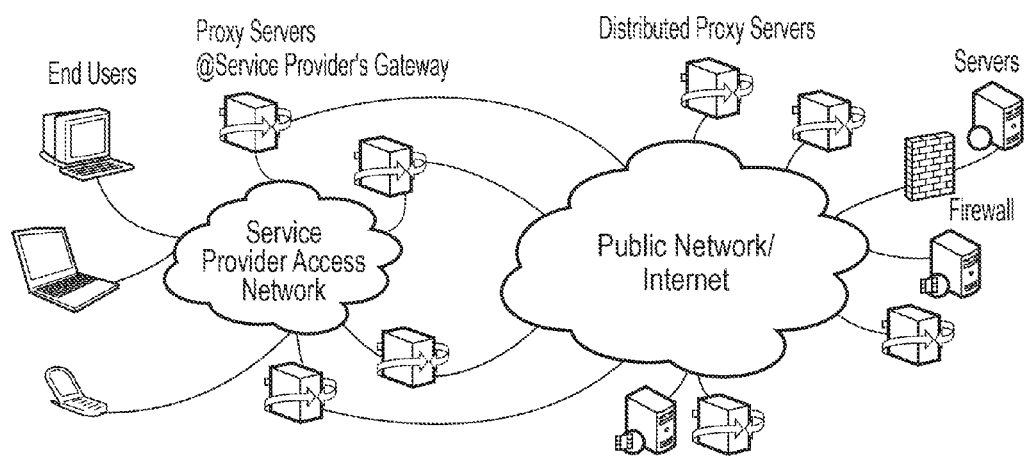
FIGS. 8 and 9 illustrate a simplified example of a deployment scenario where distributed proxy servers are used.

FIG. 8 shows a simplified example of deployment scenario where distributed proxy servers are used.

The next task is to select the appropriate remote proxy server. For this purpose, the source proxy server forwards the address of the final destination to all of the distributed proxy servers. As one embodiment, the source proxy server can pre-select a number of distributed proxy servers that are more likely to be closer to the final destination. The remote proxy servers would then try to estimate their proximity to the final destination. Such estimation can be based on delay measurements (using ICMP protocol, for example), number of hops and/or links capacity estimation, etc. The proxy servers then reports these measurements back to the source proxy server. If a proxy server with an acceptable proximity to the final destination is found, the source proxy server will decide to use the rateless code based transport protocol to deliver the packets from the end user to the server. Otherwise, if detouring traffic would result in significant delay, the source proxy server may decide not to use the rateless code based protocol. Moreover, the source proxy server may additionally benefit from existing congestion/bandwidth estimation techniques to decide whether or not to apply rateless code transport protocol. In general, the source proxy server performs measurements to the end destination and to the candidate remote proxy servers. Then, after receiving measurement reports from the remote proxy servers, the source proxy server will make a decision to use rateless code transport protocol or not.

The second issue concerns how to handle traffic flows. The problem associated with using distributed proxy servers is that there is no guarantee that the return traffic path (from the remote server to the user) passes through the remote proxy server. This is particularly important since, for service providers in most scenarios, the downlink traffic (from servers to the users) is dominant.

Figure 9:
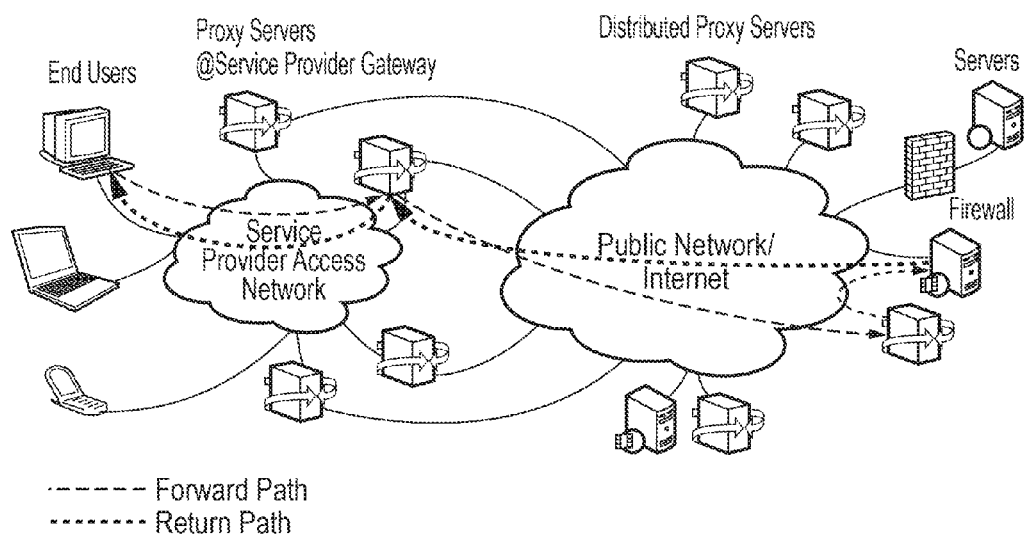

FIG. 9 illustrates an example showing that the return traffic path may pass through a different route where the remote proxy server is not included.

For this reason the proxy server's functionalities (at least the remote proxy server) should be modified. To ensure that the remote server communicates with the remote proxy server, the TCP connections are broken and re-established by the remote proxy server. In other words, upon reception and decoding the packets by the remote proxy server, the server modifies the source address of the packets to its own IP address. In effect, as the name implies the proxy server sends the packet to the remote server on behalf of the user. Subsequently, upon receiving a packet(s) from the remote server, the proxy server forwards the packet back to the user (i.e. the server modifies the destination address of the packet). Generally speaking, the ACK packets do not need to be sent using the rateless code transport protocol. In that case, the remote server could simply forward the ACK packets directly to the user without encoding.

One potential problem associated with this solution is that since proxy servers try to establish a connection with remote servers, in some cases the connections are blocked by firewalls that only allows connections from the original IP address. However, given that many service providers use NAT, and that the majority of requested services are addressed to the public servers, this scenario should not be very frequent. However, if this happens, the remote proxy server will be denied establishing a connection to the server. In that case, the remote server can signal this information back to source proxy and it will then forward the packets to the remote server directly and without rateless encoding. Moreover, the source proxy server can apply the rateless code transport protocol only to a set of services where maximizing throughput can be beneficial in terms of improving users' quality of experience. The service type can be decided based on different metrics including the source and destination port numbers. Moreover, the rateless code transport protocol can be only enabled for a subset of users (e.g. premium users).

To summarise, the following steps are performed. Upon receiving a user's packet, the source proxy server, located at the operator's gateway, makes an initial decision on applying the rateless code transport protocol. The factors involved in this initial assessment are typically the type of service requested, the user requesting the service and the capability of the proxy server (computation and memory) to handle a new rateless code based flow. If decided to consider the option, the source proxy server forward the IP address of the destination server/node together with the source and destination port numbers to all/subset of remote proxy servers. It additionally performs measurements to the candidate remote proxy servers and to the destination server. Upon reception of the request from the source proxy server, the remote proxy servers perform measurements to the final destination and assess if they can communicate with the destination server on the given ports or not. The outcome is forwarded to the source proxy server which makes a decision either to use the rateless coded transport protocol or not and if yes, which proxy server is to be used. A more simplified (but simultaneously sub-optimal) way of selecting the remote proxy server is to use fixed look up tables based on the IP address of the destination server.

If the source proxy server decides to apply the rateless code transport protocol for a given flow, it creates a new rule in its packet forwarding policy database/table indicating that all packets belonging to the given flow (identified by source and destination IP address and port number) are to be encoded using rateless code and to be forwarded (as encapsulated packets) to the remote proxy server. ACK packets could be optionally exempted.

The remote proxy server, on the other hand, would decapsulate packets that are received from the source proxy server, change their source address to its own and forward them to the final destination server. It also creates an entry on its packet forwarding rule database/table relating the source node (IP and port number) to the destination node (IP and port number). Upon receiving packets from the server, it checks the table to find the corresponding source node (user) and change the destination address of the packet to that and then encode the packet using rateless codes and forward it to the source proxy server.

The source proxy server decodes the packets and forwards it to the user.

Depending on the traffic conditions, the proxy servers may decide to use rateless code transport for only one direction of the traffic. If the return path does not need to be encoded, the remote proxy server can simply decode and forward packets from the source proxy to the server and the server can communicate back directly to the user.

Optionally, the proxy servers can send ACK to the end nodes on behalf of the other communication end to increase the packet transmission rate (increasing TCP windows) on their local link to the end nodes. This way the proxy server makes a commitment to deliver the acknowledged packets to the final destination. While this can potentially complicate the communication process (for example, assume that the destination end node fails before the proxy actually deliver the packets while the source end node assumes that packets are received successfully since ACK is received), such approach in return can further increase the throughput if goes smoothly and therefore can be only considered for certain (i.e. less sensitive) applications.

Content Distributers

With the ever increasing data demands, the role of Content Distribution Networks (CDNs) is becoming essential. This is particularly important considering the growth of video as a dominant internet traffic source. Content providers such as Youtube may face a challenging task since users expectations increasingly grow whilst enhancement in delivery networks/infrastructure may lag behind. Embodiments additionally provide a solution for CDNs to be able to benefit from the advantages offered by the rateless code transport protocol without a need for modifications being made to the users and end servers. To better understand the mechanism involved consider Youtube as one of the giant CDNs. It will be appreciated that this particular content distributer is chosen merely as an example and to illustrate how physical server selection is done in a real scenario.

Considering that over 4 billion videos are viewed daily on the Youtube, the video delivery cloud needs to be as optimised as possible. The YouTube video delivery network consists of three major components: video ID space, hierarchical logical video servers represented using multiple logical DNS namespaces, and a 3-tier physical server cache hierarchy.

YouTube uses 3 different approaches to distribute the load among various physical servers: Static load sharing using hash based mechanism—YouTube maps each video-id to a unique hostname in each of the namespace in the hierarchical DNS based host namespaces. This provides a very coarse grain load-sharing that allocates equal number of videos to each of the hostnames in the primary namespace; a semi-dynamic approach using location aware DNS resolutions—YouTube maps each DNS hostname to an IP address, which represents a physical video cache, based upon the user location and current demand. YouTube redirects user to a geographically close cache location during the "normal" hours. However, during the "busy" hours it uses DNS based resolutions to direct the user to a slightly farther location, which helps in avoiding geographical hot-spots; and Dynamic load-sharing using HTTP redirections—finally, to further balance the load on different physical servers, YouTube caches use HTTP redirections to direct user from a busy server to a not so busy video server. This helps smoothing the skewed load distribution caused by the combination of video popularity and the spontaneous video demands.

Figure 10:
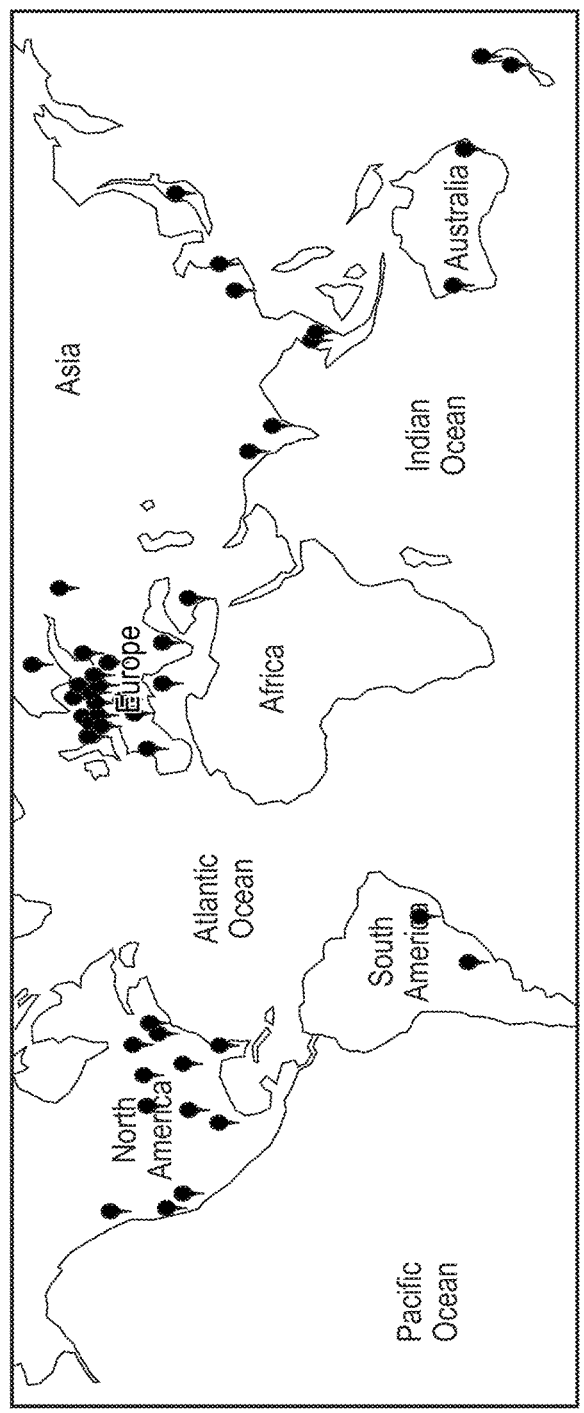
FIG. 10 shows the location of the YouTube physical servers.

FIG. 10 shows the location of the YouTube physical servers which are located in 45 cities in 25 countries.

While increasing the footprint in more geographic locations obviously results in improved quality of experience for users as a result of reduced data delivery latency, this would require significant Capex and Opex investments. Compared to the YouTube, other CDNs may not afford to have even this number of data centres. Therefore, the rateless code transport protocol is desirable for CDNs to minimise the latency of their data delivery. For this purpose, CDNs can use a large number of distributed proxy servers around the globe. In contrast to physical data centres, hiring and maintaining such proxy servers is not costly as they do not need to cache/store any data.

Upon receiving a request from a user, the closest (or most appropriate) physical cache server as well as the closest proxy server to the user are identified. The user would be then redirected to the proxy server.

The proxy server then requests the required content from the physical cache server and forwards it to the user. However, the gateway located at the physical cache server and the distributed proxy server can communicate using the rateless code transport protocol which significantly reduces the delivery latency.

Figure 11:
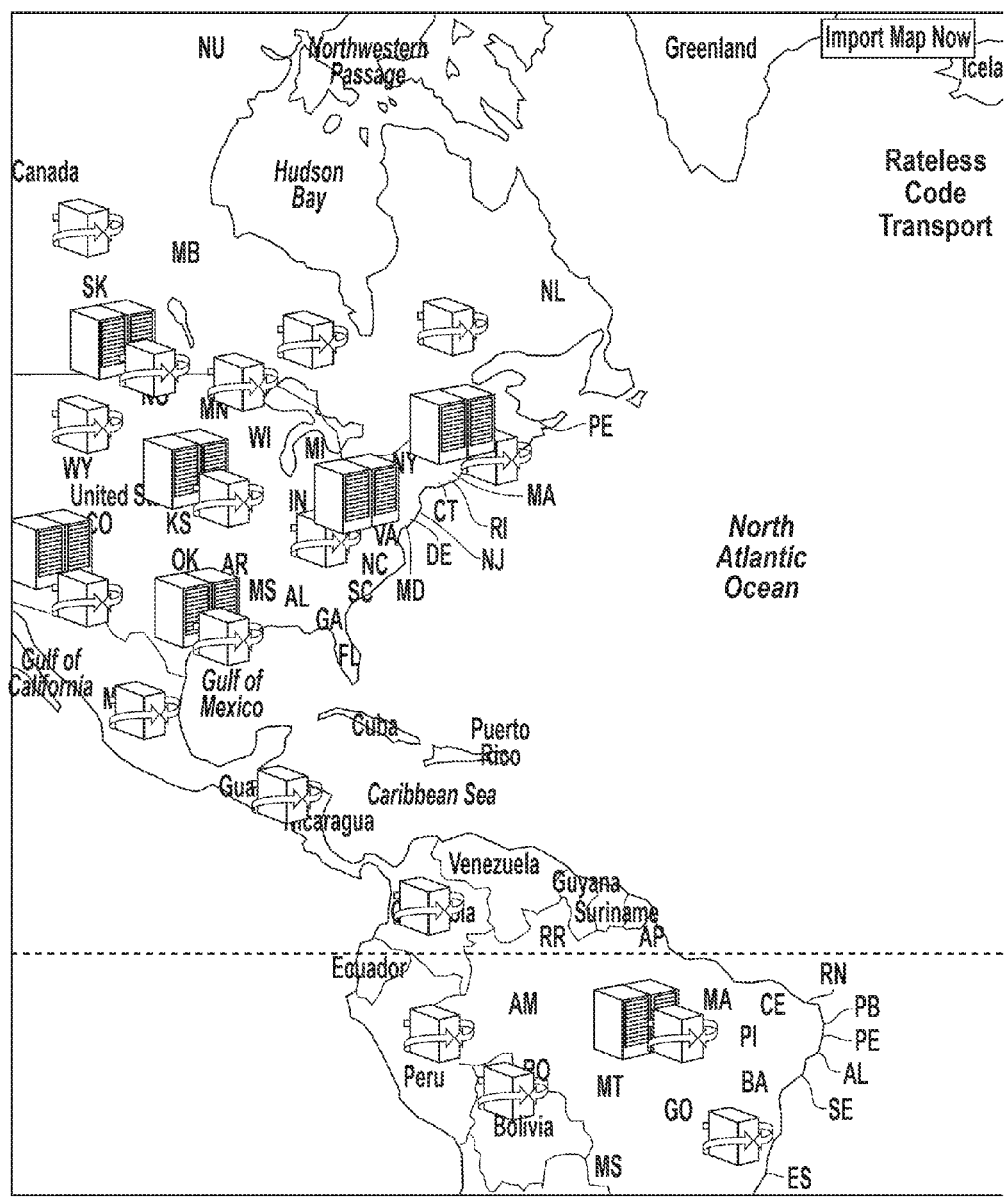
FIG. 11 shows a simplified illustration of an embodiment where a large number of proxy servers are deployed to decrease data delivery latency.
Figure 11:
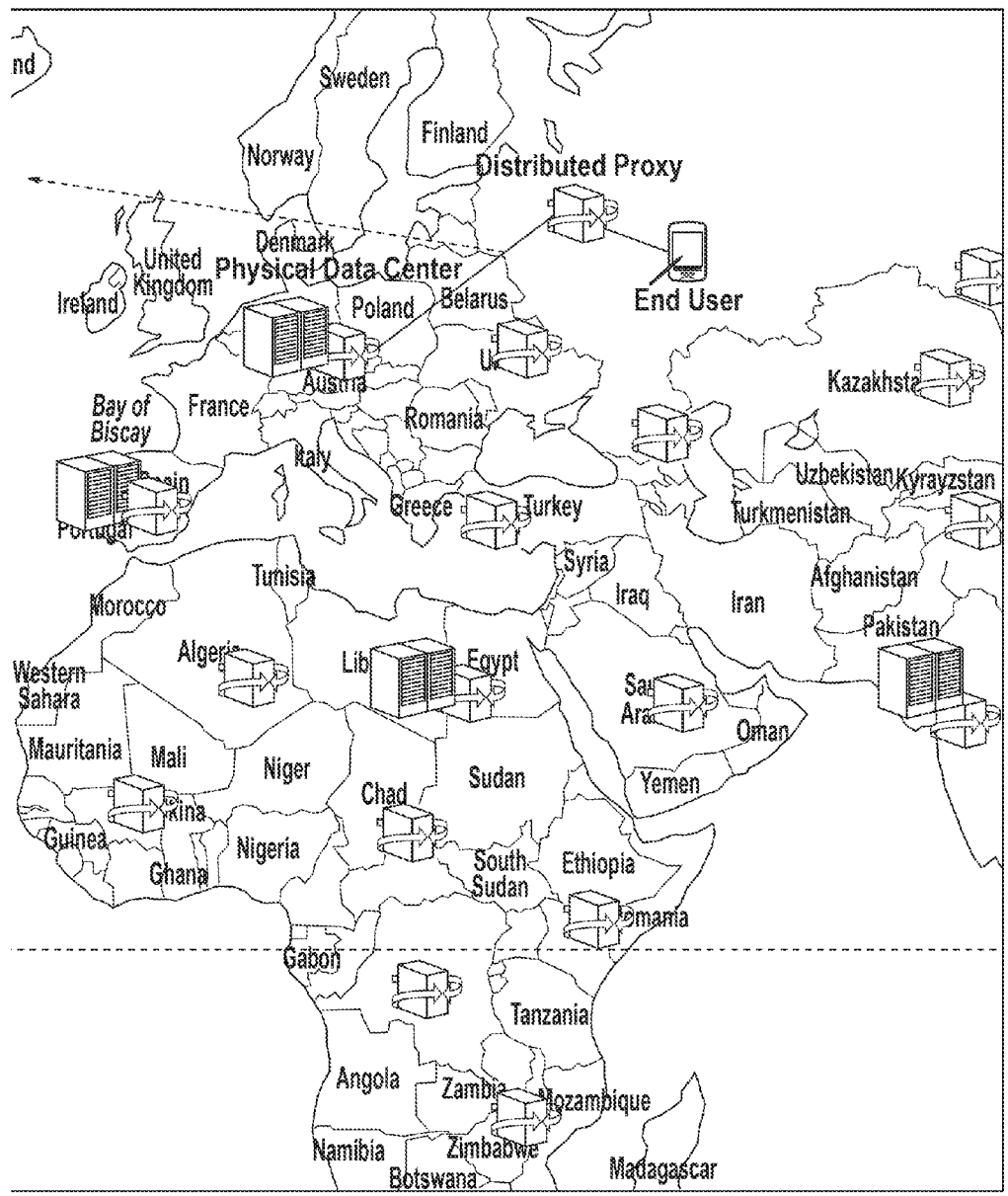

FIG. 11 shows a simplified illustration of an embodiment where a large number of proxy servers (compared to the data centres) are deployed to decrease data delivery latency for CDNs.

Compared to the previous embodiment (service providers), this is a simpler case as the CDN can redirect the user to the closest distributed proxy server and, hence, no address manipulation is required at any of the proxy servers. To identify the proper remote proxy server, similar approaches as the previous embodiment can be applied.

The distributed proxy servers should be ideally located close to the service providers POPs. This would be in mutual interests for both the CDN as well as the service provider as it results in improved quality of experience for users. In addition to the improved quality of service (QoS) for the users, this scheme is particularly attractive for the CDNs as the reduced delivery latency which in turn provides them the flexibility to choose different data centres and avoid congestion in one particular site. Even if the selected data centre is slightly further away, the delay can be compensated as a result of applying the rateless transport protocol (compared to the normal TCP, the rateless scheme can reduce the delay by factor of 4 on wired networks). Moreover, from the financial perspective, using the proposed scheme may help the CDNs to avoid the need for establishing actual data centres in various geographic locations.

Security and uncontrolled latencies are the two major concerns for data when it comes to the cloud computing deployments. Using the rateless code transport protocol, it was shown that the latency can be significantly improved compared to TCP. Additionally, since rateless packets are encoded, data encryption comes as a free by-product of the scheme. Compared to existing transport protocols, the rateless code based protocol offers significant improvement. Specifically, UDP does not grantee successful delivery of data packets and, hence, is not used for wide range of applications where reliability is strictly required. TCP, on the other hand, is a decades-old transport protocol which is very inefficient especially over long and high bandwidth pipes.

There have been a number of very recent studies and measurements that show replacing TCP with a better transport protocol can lead to extremely high gains in throughput.

The main issue with replacing a mature protocol such as the TCP is adoption of the new protocol as it would require changes in both end nodes. Embodiments provide an efficient way to enable benefiting from the rateless code based transport protocol without modifying end nodes. These embodiments describe three main scenarios: Intra-corporate/Inter-data centers communications, service providers' case and content distributers' scenario.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A target proxy node, comprising:
    at least one processor; and
    at least one memory including computer readable instructions that when executed by the at least one processor configure the at least one processor to,
        receive data from a first node for transmission to a second node over a communications link,
        select a transmission node from a group of proxy nodes and the second node, the at least one processor is configured to select a selected proxy node from the group of proxy nodes as the transmission node if a difference in a communications link characteristic of a communications link between the target proxy node, the selected proxy node and the second node and a communications link characteristic of a communications link between the target proxy node and the second node is within a threshold amount, if the difference is not within the threshold amount the at least one processor is configured to select the second node as the transmission node, and
        establish a rateless coded communications link for transfer of the data with the selected proxy node if the selected proxy node is selected by the at least one processor as the transmission node or establish a communications link for the transfer of the data directly with the second node if the second node is selected by the at least one processor as the transmission node.

2. The target proxy node of claim 1, wherein the computer readable instructions when executed by the at least one processor further configure the at least one processor to, where a plurality of proxy nodes of the group of proxy nodes are selectable as the selected proxy node, select that one of the plurality of proxy nodes whose communications link characteristic is closest to the communications link characteristic of the communications link between the target proxy node and the second node.

3. The target proxy node of claim 1, wherein the computer readable instructions when executed by the at least one processor further configure the at least one processor to, based on at least one of a type of service and a class of user associated with the transfer of the data, prevent the processor from determining a selected proxy node and instead to cause the processor to establish a communications link for the transfer of the data with the second node.

4. The target proxy node of claim 3, wherein the communications link characteristic comprises at least one of a communications delay, a number of hops and a capacity of the communications link.

5. The target proxy node of claim 1, wherein the computer readable instructions when executed by the at least one processor further configure the at least one processor to determine the selected proxy node based on a communications link characteristic of a communications link between a proxy node of the group of proxy nodes and the second node which is measured and reported by that proxy node.

6. The target proxy node of claim 1, wherein the threshold amount is adapted based on parameters of the rateless coded communications link.

7. The target proxy node of claim 6, wherein the computer readable instructions when executed by the at least one processor further configure the at least one processor to receive a request from a requesting proxy node to determine a communications link characteristic of a communications link with a node, to establish the communications link characteristic of the communications link with the node and to report the communications link characteristic to the requesting proxy node.

8. The target proxy node of claim 7, wherein
    the computer readable instructions when executed by the at least one processor further configure the at least one processor to decode a received rateless coded communications link to extract data, to substitute a source address identifying a source node with a source address identifying the target proxy node and to forward the data to a receiving node.

9. The target proxy node of claim 8, wherein
    the computer readable instructions when executed by the at least one processor further configure the at least one processor to decode the received rateless coded communications link to extract data and to store the data for access by the receiving node.

10. The target proxy node of claim 9, wherein the computer readable instructions when executed by the at least one processor further configure the at least one processor to substitute a destination address identifying the target proxy node with a destination address identifying another proxy node and to utilise a rateless coded communications link for the transfer of the data with the another proxy node.

11. The target proxy node of claim 10, wherein the computer readable instructions when executed by the at least one processor further configure the at least one processor, when no acknowledgement indication is received from the receiving node, to forward an indication of rejection to the source node.

12. The target proxy node of claim 11, wherein the computer readable instructions when executed by the at least one processor further configure the at least one processor to, on receipt of the indication of the rejection, prevent the processor from determining a selected proxy node and instead to cause the processor to establish a communications link for the transfer of the data with the second node.

13. The target proxy node of claim 12, wherein the computer readable instructions when executed by the at least one processor further configure the at least one processor to decode the rateless coded communications link to extract data, to substitute the destination address identifying the target proxy node with Han the destination address identifying the first node and to forward the data to the first node.

14. A target proxy node method, comprising:
receiving data from a first node for transmission to a second node over a communications link;
determining a selected proxy node from a group of proxy nodes, said selected proxy node being one of the group of proxy nodes where a difference in a communications link characteristic of a communications link between a target proxy node, the selected proxy node and the second node and a communications link characteristic of a communications link between the target proxy node and the second node falls within a threshold amount and otherwise selecting the second node; and
establishing a rateless coded communications link for transfer of the data with the selected proxy node when selected and otherwise establishing a communications link for the transfer of the data directly with the second node.

15. A non-transitory computer readable medium including computer readable instruction that when executed by a processor to configures the processor to perform the method of claim 14.

* * * * *